(12) United States Patent
Vardhan et al.

(10) Patent No.: US 9,544,782 B2
(45) Date of Patent: Jan. 10, 2017

(54) SYSTEMS, APPARATUS, AND METHODS FOR RANGE EXTENSION OF WIRELESS COMMUNICATION

(71) Applicant: QUALCOMM Incorporated, San Diego, CA (US)

(72) Inventors: Anurag Vardhan, San Diego, CA (US); Maksim Krasnyanskiy, San Diego, CA (US); George Cherian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 531 days.

(21) Appl. No.: 13/760,451

(22) Filed: Feb. 6, 2013

(65) Prior Publication Data
US 2014/0126462 A1    May 8, 2014

Related U.S. Application Data

(60) Provisional application No. 61/721,762, filed on Nov. 2, 2012.

(51) Int. Cl.
*H04W 16/26* (2009.01)
*H04B 7/155* (2006.01)
(Continued)

(52) U.S. Cl.
CPC ......... *H04W 16/26* (2013.01); *H04B 7/15507* (2013.01); *H04W 28/02* (2013.01); *H04W 84/047* (2013.01)

(58) Field of Classification Search
CPC ....... H04B 1/403; H04B 1/56; H04B 7/15507; H04W 16/26; H04W 84/047; H04W 28/02; H04W 24/02–24/04; H04W 16/06–16/08; H04W 36/0061
(Continued)

(56) References Cited

U.S. PATENT DOCUMENTS 7,092,670 B2 *  8/2006  Tanaka et al. .................... 455/7
7,277,708 B2    10/2007  Nakatsugawa et al.
(Continued)

FOREIGN PATENT DOCUMENTS

WO    WO-2009131898 A1    10/2009
WO    WO-2010120149 A2    10/2010
(Continued)

OTHER PUBLICATIONS

International Search Report and Written Opinion—PCT/US2013/068115—ISA/EPO—Feb. 5, 2014.

*Primary Examiner* — Chi H Pham
*Assistant Examiner* — Robert Lopata
(74) *Attorney, Agent, or Firm* — Eric Ho

(57) ABSTRACT

Systems, methods, and devices for communicating data in a wireless communications network are described herein. In some aspects, a relay may associate with an access point and then clone the access point by transmitting the service set identifier of the access point. An association between a wireless node and a relay may be formed such that the relay provides relay services for wireless network communication between the access point and the wireless node. In some aspects, the relay may generate messages which communicate its available capacity so that downstream nodes may determine from which relays service may be available. In addition, each node may generate messages for upstream relays which communicate the load an association with the node would cause. Through such communication between relays, admission control may be used to minimize associations being dropped because of insufficient available capacity.

33 Claims, 9 Drawing Sheets

(51) Int. Cl.
*H04W 84/04* (2009.01)
*H04W 28/02* (2009.01)

(58) Field of Classification Search
USPC .................................. 370/276, 277, 280
See application file for complete search history.

(56) References Cited

U.S. PATENT DOCUMENTS

| | | | | |
|---|---|---|---|---|
| 7,720,000 | B2* | 5/2010 | Yoshida et al. | 370/252 |
| 7,873,002 | B2* | 1/2011 | Cai | 370/329 |
| 8,208,420 | B2* | 6/2012 | Liu et al. | 370/315 |
| 8,249,029 | B2 | 8/2012 | Palanki et al. | |
| 8,289,942 | B2 | 10/2012 | Habetha et al. | |
| 8,355,357 | B2* | 1/2013 | Kang et al. | 370/315 |
| 8,488,507 | B2* | 7/2013 | Luft et al. | 370/311 |
| 8,811,306 | B2* | 8/2014 | Callard et al. | 370/329 |
| 2004/0196795 | A1* | 10/2004 | Yang | 370/254 |
| 2006/0046643 | A1* | 3/2006 | Izumikawa et al. | 455/7 |
| 2006/0146764 | A1* | 7/2006 | Takemoto et al. | 370/338 |
| 2006/0270341 | A1* | 11/2006 | Kim et al. | 455/16 |
| 2007/0081507 | A1* | 4/2007 | Koo et al. | 370/338 |
| 2008/0075094 | A1* | 3/2008 | Ahn et al. | 370/400 |
| 2008/0108355 | A1* | 5/2008 | Oleszcsuk | 455/442 |
| 2008/0144629 | A1* | 6/2008 | Tomiyasu et al. | 370/392 |
| 2008/0181168 | A1* | 7/2008 | Han et al. | 370/315 |
| 2008/0285500 | A1* | 11/2008 | Zhang et al. | 370/315 |
| 2009/0017753 | A1* | 1/2009 | Kim et al. | 455/10 |
| 2009/0046657 | A1 | 2/2009 | Kim et al. | |
| 2009/0116420 | A1* | 5/2009 | Jeong et al. | 370/312 |
| 2009/0141667 | A1 | 6/2009 | Jin et al. | |
| 2009/0225695 | A1 | 9/2009 | Kang et al. | |
| 2009/0245164 | A1* | 10/2009 | Lu | 370/315 |
| 2009/0245165 | A1* | 10/2009 | Li | 370/315 |
| 2009/0252065 | A1* | 10/2009 | Zhang et al. | 370/256 |
| 2009/0252078 | A1* | 10/2009 | Lim et al. | 370/315 |
| 2010/0002582 | A1* | 1/2010 | Luft et al. | 370/230.1 |
| 2010/0173644 | A1* | 7/2010 | Koyanagi | 455/453 |
| 2010/0227620 | A1* | 9/2010 | Naden et al. | 455/445 |
| 2010/0238826 | A1 | 9/2010 | Borran et al. | |
| 2011/0110310 | A1* | 5/2011 | Cai | 370/328 |
| 2011/0149769 | A1* | 6/2011 | Nagaraja | 370/252 |
| 2011/0151774 | A1* | 6/2011 | Li et al. | 455/9 |
| 2011/0170437 | A1* | 7/2011 | Zhou et al. | 370/252 |
| 2011/0189946 | A1* | 8/2011 | Fukuzawa et al. | 455/7 |
| 2011/0269394 | A1* | 11/2011 | Mildh et al. | 455/7 |
| 2011/0292799 | A1* | 12/2011 | Dottling et al. | 370/235 |
| 2011/0310814 | A1* | 12/2011 | Callard et al. | 370/329 |
| 2012/0002537 | A1 | 1/2012 | Bao et al. | |
| 2012/0044814 | A1* | 2/2012 | Natarajan et al. | 370/246 |
| 2012/0057503 | A1* | 3/2012 | Ding et al. | 370/254 |
| 2012/0202503 | A1* | 8/2012 | Kitaji | 455/438 |
| 2012/0218886 | A1* | 8/2012 | Van Phan et al. | 370/229 |
| 2012/0236781 | A1* | 9/2012 | Liu et al. | 370/315 |
| 2012/0250603 | A1* | 10/2012 | Huang et al. | 370/315 |
| 2012/0295626 | A1* | 11/2012 | Kitaji | 455/438 |
| 2012/0307668 | A1* | 12/2012 | Wiemann et al. | 370/252 |
| 2012/0322363 | A1* | 12/2012 | Tsubouchi et al. | 455/9 |
| 2013/0045674 | A1* | 2/2013 | Koyanagi | 455/9 |
| 2013/0052941 | A1* | 2/2013 | Kitaji | 455/7 |
| 2013/0070664 | A1* | 3/2013 | Nagata et al. | 370/315 |
| 2013/0070780 | A1* | 3/2013 | Hozumi | 370/437 |
| 2013/0150047 | A1* | 6/2013 | Zhang et al. | 455/436 |
| 2013/0195015 | A1 | 8/2013 | Takahashi et al. | |
| 2013/0201902 | A1* | 8/2013 | Nagata et al. | 370/315 |
| 2013/0225166 | A1* | 8/2013 | Akhtar et al. | 455/435.1 |
| 2013/0273836 | A1* | 10/2013 | Lim et al. | 455/7 |
| 2013/0324130 | A1* | 12/2013 | Maruta | 455/436 |
| 2014/0036763 | A1* | 2/2014 | Borran et al. | 370/315 |
| 2015/0043422 | A1* | 2/2015 | Fujishiro et al. | 370/315 |

FOREIGN PATENT DOCUMENTS

| | | |
|---|---|---|
| WO | WO-2010121661 A1 | 10/2010 |
| WO | WO-2011085519 A1 | 7/2011 |
| WO | WO-2011153507 A2 | 12/2011 |
| WO | WO-2012070045 A2 | 5/2012 |

* cited by examiner

SYSTEMS, APPARATUS, AND METHODS FOR RANGE EXTENSION OF WIRELESS COMMUNICATION

CROSS REFERENCE TO RELATED APPLICATIONS

This application claims priority to U.S. Provisional No. 61/721,762, titled "SYSTEMS, APPARATUS, AND METHODS FOR RANGE EXTENSION OF WIRELESS COMMUNICATION," filed Nov. 2, 2012, which is hereby incorporated by reference in its entirety.

BACKGROUND

Field

The present application relates generally to wireless communications, and more specifically to systems, methods, and devices for using a relay in a wireless communication network.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. In some aspects, the devices on a wireless network may have a limited transmission range. Thus, improved systems, methods, and devices for communicating in a wireless network are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

Claims will be added when they become finalized.

DETAILED DESCRIPTION

Figure 1:
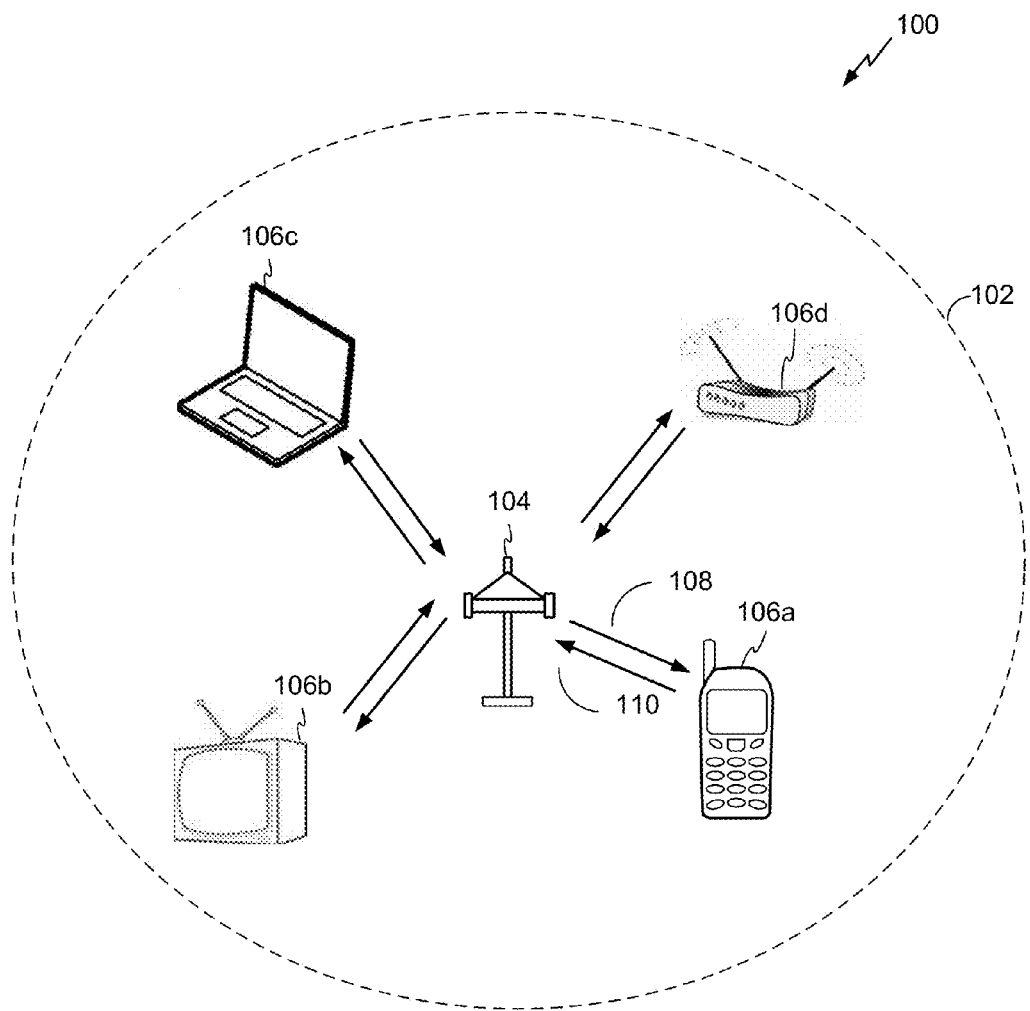
FIG. 1 shows an exemplary wireless communication system 100. The wireless communication system 100 may operate pursuant to a wireless standard, for example any one of the 802.11 standards.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAB"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol such as 802.11) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement any one of the 802.11 standards, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

The transmission range of wireless devices on a wireless network is of a limited distance. To accommodate the limited transmission range of devices communicating on a wireless network, access points may be positioned such that an access point is within the transmission range of the devices. In wireless networks that include devices separated by substantial geographic distance, multiple access points may be necessary to ensure all devices can communicate on the network. Including these multiple access points may add cost to the implementation of the wireless networks. Thus, a wireless network design that reduces the need for additional access points when the wireless network spans a distance that may exceed the transmission range of devices on the network may be desired.

A relay may be less expense than an access point. For example, some access point designs may include both wireless networking hardware and hardware necessary to interface with traditional wired LAN based technologies such as Ethernet. This additional complexity may cause access points to be more expensive than relays. Additionally, because the access points may interface with a wired LAN, the cost of installing multiple access points goes beyond the cost of the access point itself, and may include wiring costs associated with the wired LAN, and the labor and other installation costs associated with installing and configuring a wired LAN. Use of a relay instead of an access point may reduce some of the costs associated with an access point. For example, because a relay may use only wireless networking technologies, the design of the relay may provide for reduced cost when compared to access point designs. Additionally, the ability to relay wireless traffic may reduce the need for wired LAN cabling and installation expenses associated with access points.

FIG. 1 shows an exemplary wireless communication system 100. The wireless communication system 100 may operate pursuant to a wireless standard, for example the 802.11 standards. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Figure 2A:
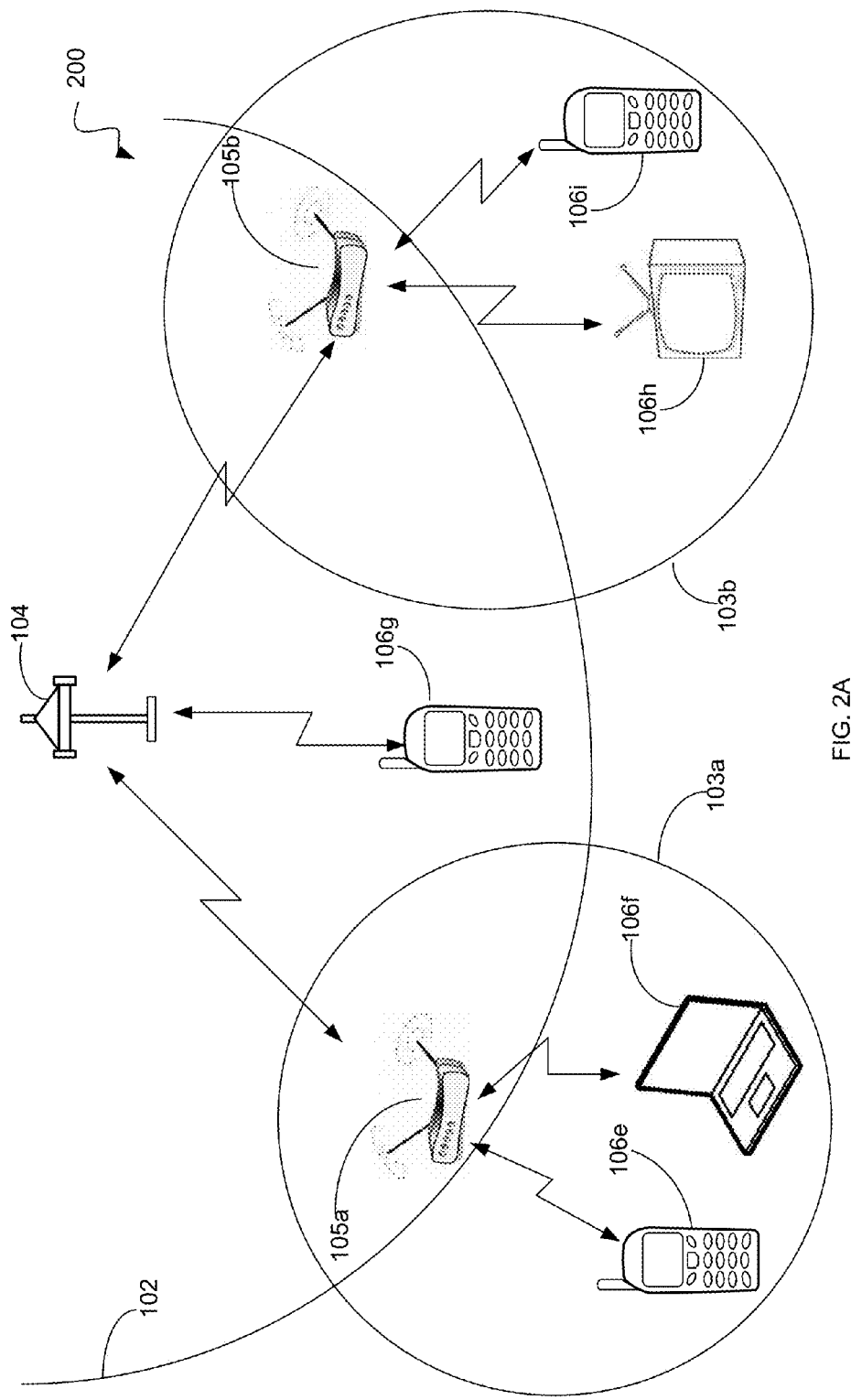
FIG. 2A shows another exemplary wireless communication system 200 in which aspects of the present disclosure may be employed.

FIG. 2A shows another exemplary wireless communication system 200 in which aspects of the present disclosure may be employed. The wireless communication system 200 may also operate pursuant to a wireless standard, for example any one of the 802.11 standards. The wireless communication system 200 may include an AP 104, which communicates with relays 105*a-b* and some STAs 106. The relays 105*a-b* may also communicate with some STAs 106. As in FIG. 1, the wireless communication system 200 may function in accordance with OFDM/OFDMA techniques or CDMA techniques.

The AP 104 may act as a base station and provide wireless communication coverage in a basic service area (BSA) 102. In an embodiment, some STAs 106 may be located within the AP's BSA 102 while other STAs may be located outside the AP's BSA 102. For example, as illustrated in FIG. 2A, STA 106*g* may be located within the AP 104's BSA 102. As such, STA 106*g* may associate with AP 104 and perform wireless communications directly with AP 104. Other STAs, for example, STAs 106*e-f* and 106*h-i* may be outside the BSA 102 of the AP 104. Relays 105*a-b* may be inside the BSA 102 of the AP 104. As such, relays 105*a-b* may be able to associate with the AP 104 and perform wireless communications directly with the AP 104.

The AP 104 may transmit a beacon signal (or simply a "beacon"), via a communication link such as the downlink 108, to other nodes STAs 106 of the system 200, which may help STA 106*g* or relays 105*a-b* to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In some aspects, the STA 106*g* or relays 105*a-b* may be required to associate with the AP 104 in order to send communications to and/or receive communications from the AP 104. In one aspect, information for associating is included in a beacon broadcast by the AP 104. To receive such a beacon, the STA 106*g* or the relays 105*a-b* may, for example, perform a broad coverage search over a coverage region. A search may also be performed by the STA 106 or relays 105*a-b* by sweeping a coverage region in a lighthouse fashion, for example. After receiving the information for associating, the STA 106*g* or relays 105*a-b* may transmit a reference signal, such as an association probe or request, to the AP 104. In some aspects, the AP 104 may use backhaul services, for example, to communicate with a larger network, such as the Internet or a public switched telephone network (PSTN).

The AP 104 along with the STAs 106 or relays 105*a-b* associated with the AP 104 and that use the AP 104 for communication may be referred to as a basic service set (BSS). It should be noted that the wireless communication system 200 may not have a central AP 104, but rather may function as a peer-to-peer network between the STAs 106. Accordingly, the functions of the AP 104 described herein may alternatively be performed by one or more of the STAs 106 or relays 105*a-b*.

The relays 105*a-b* may also act as a base station and provide wireless communication coverage in a basic service area 103*a* and 103*b* respectively. In an embodiment, some STAs 106 may be located within the BSA of a relay 105*a-b*. For example, STA 106*e* and STA 106*f* are illustrated within the BSA 103*a* of relay 105*a*. STA 106*h* and STA 106*i* are illustrated within the BSA 103*b* of relay 105*b*. As such, STAs 106*e-f* may associate with relay 105*a* and perform wireless communications directly with relay 105*a*. Relay 105*a* may form an association with AP 104 and perform wireless communications with AP 104 on behalf of STA 106*e-f*. Similarly, STAs 106*h-i* may associate with relay 105*b* and perform wireless communications directly with relay 105*b*. Relay 105*b* may form an association with AP 104 and perform wireless communications with AP 104 on behalf of STA 106*h-i*.

In some aspects, the STAs 106*e-f* and STA 106*h-i* may be required to associate with relays 105*a-b* in order to send communications to and/or receive communications from the relays 105a-b. In one aspect, information for associating is included in a beacon broadcast by the relays 105a-b. The beacon signal may include the same service set identifier (SSID) as that used by an access point with which the relay has formed an association. To receive such a beacon, the STAs 106e-f and 106h-i may, for example, perform a broad coverage search over a coverage region. A search may also be performed by the STAs 106e-f and 106h-i by sweeping a coverage region in a lighthouse fashion, for example.

In an embodiment, after the relay has formed an association with an access point and provided a beacon signal, one or more stations may then form an association with the relay. After receiving the information for associating, the STAs 106e-f and 106h-i may transmit a reference signal, such as an association probe or request, to the relays 105a-b. The relays may then accept the association request and send an association reply to the STAs. The stations may then send and receive data with the relay. The relay may forward data received from the one or more stations to an access point with which it has also formed an association. Similarly, when the relay receives data from the access point, the relay may forward the data received from the access point to an appropriate station. By performing relay services between a station and an access point, a station may effectively communicate with an access point, despite being unable to directly communicate with the access point.

Figure 2B:
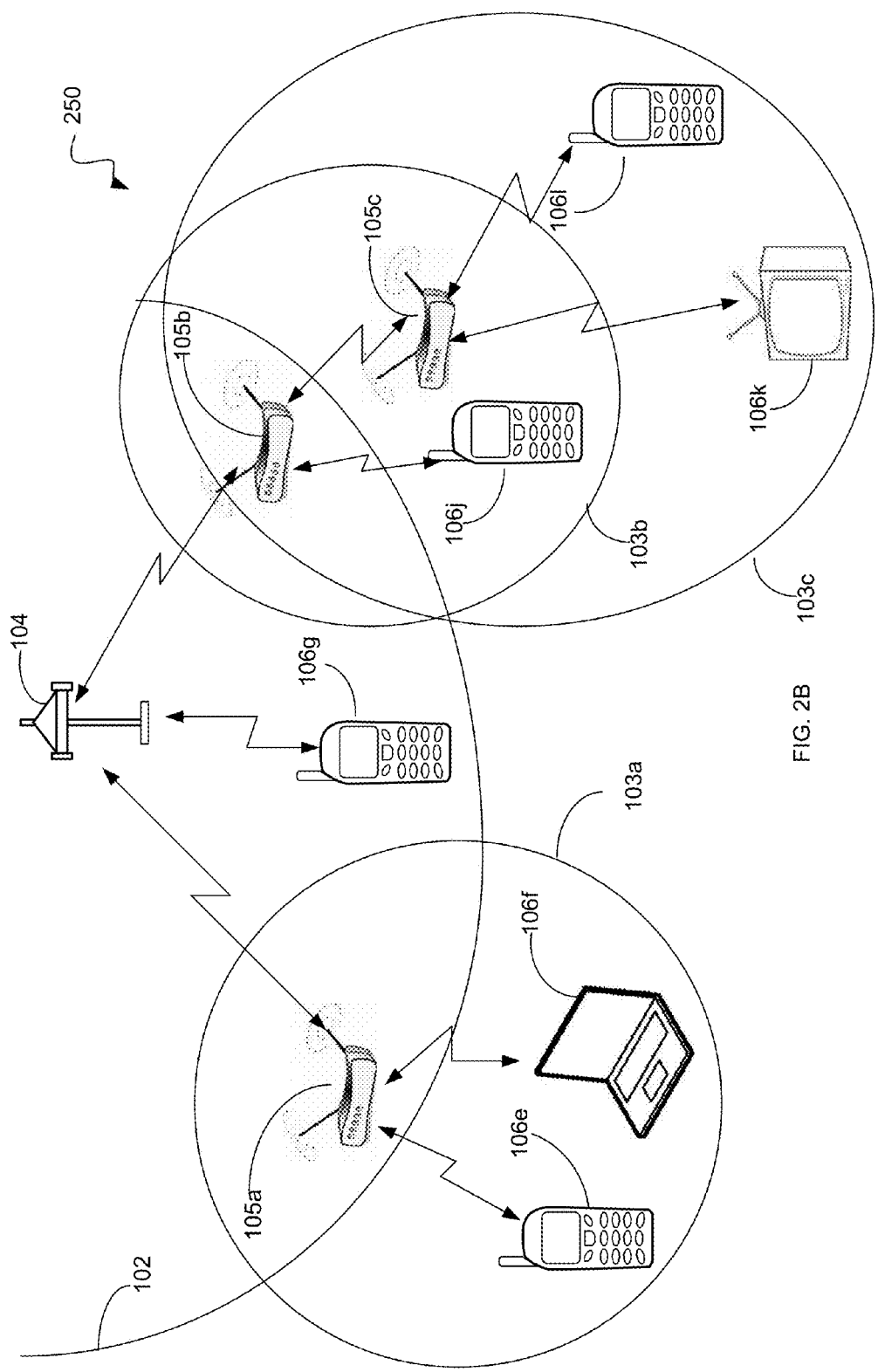
FIG. 2B shows another exemplary wireless communication system 200 in which aspects of the present disclosure may be employed.

FIG. 2B shows another exemplary wireless communication system 250 in which aspects of the present disclosure may be employed. The wireless communication system 250 may also operate pursuant to a wireless standard, for example any one of the 802.11 standards. Similar to FIG. 2A, the wireless communication system 250 may include an AP 104, which communicates with wireless nodes including relays 105a-b and STAs 106. The relays 105a-b may also communicate with wireless nodes such as some STAs 106. FIG. 2B differs from FIG. 2A in that the relays 105a-b may also communicate with wireless nodes that are other relays, such as relay 105c. As shown, relay 105b is in communication with relay 105c. Relay 105c may also communicate with some STAs 106. As in FIGS. 1 and 2A, the wireless communication system 250 may function in accordance with OFDM/OFDMA techniques or CDMA techniques.

As in FIG. 2A, the AP 104 and relays a-b may act as a base station and provide wireless communication coverage in a basic service area (BSA). Relay 105c may also act as a base station and provide wireless communication in a BSA. Each of AP 104 and relays a-c are shown with a basic service area 102 and 103a-c respectively. In an embodiment, some STAs 106 may be located within the AP's BSA 102 while other STAs may be located outside the AP's BSA 102. For example, similar to FIG. 2A, STA 106g may be located within the AP 104's BSA 102. As such, STA 106g may associate with AP 104 and perform wireless communications directly with AP 104. Other STAs, for example, STAs 106e-f and STAs 106j-l may be outside the BSA 102 of the AP 104. Relays 105a-b may be inside the BSA 102 of the AP 104. As such, relays 105a-b may be able to associate with the AP 104 and perform wireless communications directly with the AP 104.

Relay 105c may be outside the BSA 102 of the AP 104. Relay 105c may be within the BSA 103b of relay 105b. Therefore, relay 105c may associate with relay 105b and perform wireless communications with relay 105b. Relay 105b may then perform wireless communications with AP 104 on behalf of relay 105c. STAs 106k-l may associate with relay 105c. STAs 106k-l may then perform wireless communications via indirect communication with AP 104 and relay 105b via communication with relay 105c.

To communicate with relay 105c, STAs 106k-l may associate with relay 105c in a similar manner as STAs 106e-f associate with relay 105a as described above. Similarly, relay 105c may associate with relay 105b in a similar manner as relay 105b associates with AP 104. Therefore, the wireless communication system 250 provides a multi-tiered topology of relays extending out from AP 104 to provide wireless communications services beyond the BSA of AP 104. STAs 106 may communicate within the wireless communication system 250 at any level of the multi-tiered topology. For example, as shown, STAs may communicate directly with the AP 104, as shown by STA 106g. STAs may also communicate at a "first tier" of relays, for example, as shown by STAs 106e-f and 106j which communicate with relays 105a-b respectively. STAs may also communicate at a second tier of relays, as shown by STAs 106k-l, which communicate with relay 105c which communicates with upstream relay 105b. Accordingly, the downstream devices 106k-l communicate with the upstream relay 105b and to AP 104 via relay 105c.

Figure 3:
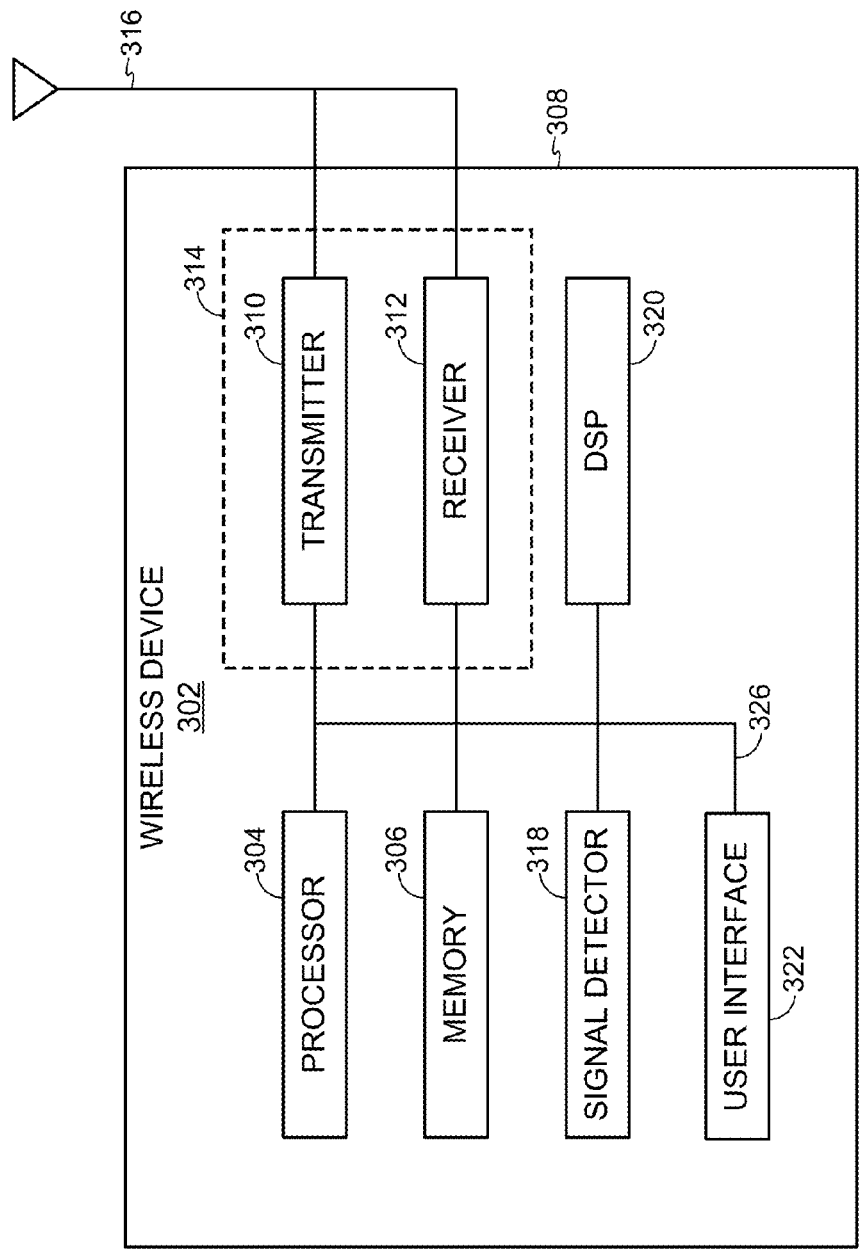
FIG. 3 shows an exemplary functional block diagram of a wireless device 302 that may be employed within the wireless communication system 100 of FIG. 1, 200 of FIG. 2A, or 250 of FIG. 2B.

FIG. 3 shows an exemplary functional block diagram of a wireless device 302 that may be employed within the wireless communication system 100 of FIG. 1 or 200 of FIG. 2A, or 250 of FIG. 2B. The wireless device 302 is an example of a device that may be configured to implement the various methods described herein. For example, the wireless device 302 may comprise the AP 104, one of the STAs 106, or one of the relays 320 and/or 330.

The wireless device 302 may include a processor 304 which controls operation of the wireless device 302. The processor 304 may also be referred to as a central processing unit (CPU). Memory 306, which may include both read-only memory (ROM) and random access memory (RAM), may provide instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and/or a receiver 312 to allow transmission and reception of data between the wireless device 302 and a remote location. The transmitter 310 and receiver 312 may be combined into a transceiver 314.

An antenna 316 may be attached to the housing 308 and electrically coupled to the transceiver 314. The wireless device 302 may also include (not shown) multiple transmitters, multiple receivers, multiple transceivers, and/or multiple antennas.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals. The DSP 320 may be configured to generate a packet for transmission. In some aspects, the packet may comprise a physical layer data unit (PPDU).

The wireless device 302 may further comprise a user interface 322 in some aspects. The user interface 322 may comprise a keypad, a microphone, a speaker, and/or a display. The user interface 322 may include any element or component that conveys information to a user of the wireless device 302 and/or receives input from the user.

The various components of the wireless device 302 may be coupled together by a bus system 326. The bus system 326 may include a data bus, for example, as well as a power bus, a control signal bus, and a status signal bus in addition to the data bus. Those of skill in the art will appreciate the components of the wireless device 302 may be coupled together or accept or provide inputs to each other using some other mechanism.

Although a number of separate components are illustrated in FIG. 3, those of skill in the art will recognize that one or more of the components may be combined or commonly implemented. For example, the processor 304 may be used to implement not only the functionality described above with respect to the processor 304, but also to implement the functionality described above with respect to the signal detector 318 and/or the DSP 320. Further, each of the components illustrated in FIG. 3 may be implemented using a plurality of separate elements.

The wireless device 302 may comprise an AP 104, a STA 106, or a relay 105, and may be used to transmit and/or receive communications. That is, either AP 104, STA 106, or relay 105, may serve as transmitter or receiver devices. Certain aspects contemplate signal detector 318 being used by software running on memory 306 and processor 304 to detect the presence of a transmitter or receiver.

Figure 4A:
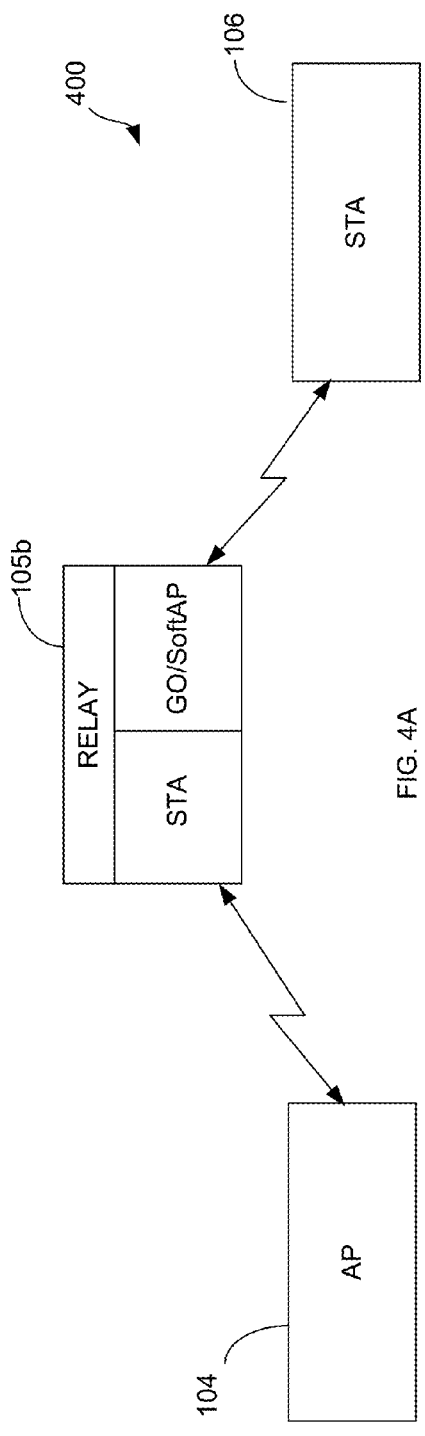
FIG. 4A illustrates a wireless communications system 400 comprising an AP 104, a station 106, and a relay 105.

FIG. 4A illustrates a wireless communications system 400 comprising an AP 104, a station (STA) 106, and a relay 105b. Note that while only one STA 106 and only one relay 105b are illustrated, the wireless communications system 400 may comprise any number of STAs and relays. In some embodiments, the access point 104 may be outside the transmission range of the station 106. In some embodiments, the station 106 may also be outside the transmission range of the access point 104. In these embodiments, the AP 104 and the STA 106 may be able to communicate with the relay 105, which may be within the transmission range of both the AP 104 and station 106. In some embodiments, both the AP 104 and station 106 may be within the transmission range of the relay 105b.

In some disclosed implementations, the relay 105b may communicate with the AP 104 in the same manner as a station would communicate with the AP. In some aspects, the relay may implement a "Wi-Fi Direct" point to point group owner capability or a SoftAP capability. In some aspects, a relay 105b may associate with the AP 104 in order to send communications to and/or receive communications from the AP 104. In one aspect, information for associating is included in a beacon signal broadcast by the AP 104. To receive such a beacon, the relay 105b may, for example, perform a broad coverage search over a coverage region. A search may also be performed by the relay 105 by sweeping a coverage region in a lighthouse fashion, for example. After receiving the information for associating, the relay 105b may transmit a reference signal, such as an association probe or request, to the AP 104. In an embodiment, the relay 105b may utilize a first station address when exchanging network messages with the AP 104.

Similarly, the STA 106 may associate with the relay 105b as if it were an AP. In some aspects, the STA 106 may associate with the relay 105b in order to send communications to and/or receive communications from the relay 105. In one aspect, information for associating is included in a beacon broadcast by the relay 105. After receiving the information for associating, the STA 106 may transmit a reference signal, such as an association probe or request, to the relay 105b. In one embodiment, the relay 105b may utilize a second station address that is different than the first station address when exchanging network messages with one or more stations.

Figure 4B:
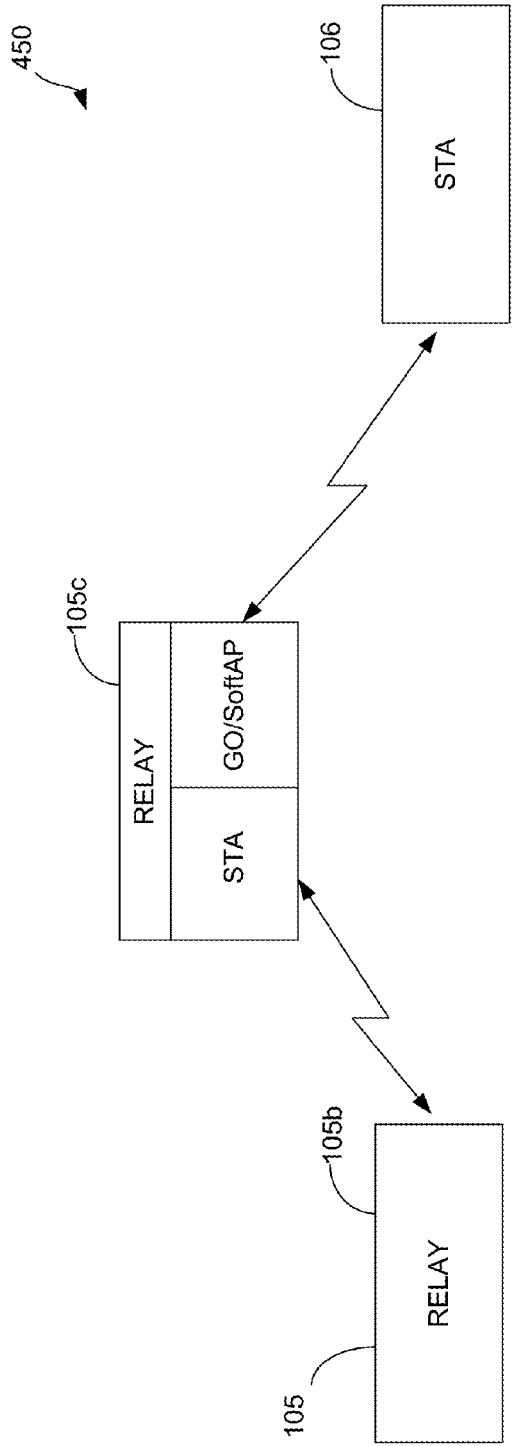
FIG. 4B illustrates a wireless communications system 450 comprising a relay 105b, a relay 105c, and a station 106.

FIG. 4B illustrates a wireless communications system 450 comprising a relay 105b, a relay 105c, and a station (STA) 106.

In some disclosed implementations, the relay 105c may communicate with the relay 105b in the same manner as a station would communicate with an AP. In some aspects, relay 105c may implement a "Wi-Fi Direct" point to point group owner capability or a SoftAP capability. In some aspects, a relay 105c may associate with the relay 105b in order to send communications to and/or receive communications from the relay 105b. In one aspect, information for associating is included in a beacon signal broadcast by the relay 105b. To receive such a beacon, the relay 105c may, for example, perform a broad coverage search over a coverage region. A search may also be performed by the relay 105c by sweeping a coverage region in a lighthouse fashion, for example. After receiving the information for associating, the relay 105c may transmit a reference signal, such as an association probe or request, to the relay 105b. In an embodiment, the relay 105c may utilize a first station address when exchanging network messages with the relay 105b.

Similarly, the STA 106 may associate with the relay 105c as if it were an AP. In some aspects, the STA 106 may associate with the relay 105c in order to send communications to and/or receive communications from the relay 105c. In one aspect, information for associating is included in a beacon broadcast by the relay 105c. After receiving the information for associating, the STA 106 may transmit a reference signal, such as an association probe or request, to the relay 105c. In one embodiment, the relay 105c may utilize a second station address that is different than the first station address when exchanging network messages with one or more stations.

In a multi-tiered topology, relays are capable of connecting to another relay (instead of directly to the access point). If a relay that is actively serving multiple STAs were to find another upstream relay, it should break connection with the current relay link and establish connection with the other upstream relay. Without some form of admission control, there may be no mechanism to determine the available capacity of an upstream relay or to reject unworkable associations. The problem condition can be detected later, but then a previously accepted association has to be dropped.

This causes instability in the BSS. In addition, notification of forwarding table changes to upstream relays should occur as soon as possible to avoid latency when a relay changes its upstream relay.

The upstream relay determines whether to accept the request by considering its own available capacity and the load the addition of the relay would require.

The load associated with the relay can be communicated from the relay to the upstream relay with a message. For example, within an association request, a parameter representing the load associated with the relay can be communicated to the upstream relay. For example, a list of IDs of devices associated with the relay may be included in the message, for example, in an information element, which may be called Relay-Reachable-Address. The IDs may, for example, be MACIDs. Other IDs may be used. Within an action frame, a parameter representing the load associated with the relay can be communicated to the upstream relay. For example, a list of IDs of devices associated with the relay may be included in the message, for example, in an information element, which may be called Relay-Reachable-Address. The IDs may, for example, be MACIDs. Other IDs may be used. In some embodiments, a quantity of downstream devices associated with the relay may be communicated to the upstream relay.

The upstream relay can determine if it can accept association from a downstream relay based on the number of addresses associated with the downstream relay. If it does not have available capacity, the upstream relay declines the association request. If the upstream relay can accept the load, then it can update its forwarding table and trigger updates using a new action frame to all upstream relays to do the same, for example, by sending a Relay-Reachable-Addresses action frame.

In some embodiments, the upstream relay determines whether it can accept the association request based on available capacity of one or more relays further upstream. For example, in some embodiments, the relay stores an available capacity value for further upstream relays with which it is associated. Alternatively, the upstream relay may send a message to the further upstream relays requesting the available capacity information of the relays further upstream.

Figure 5A:
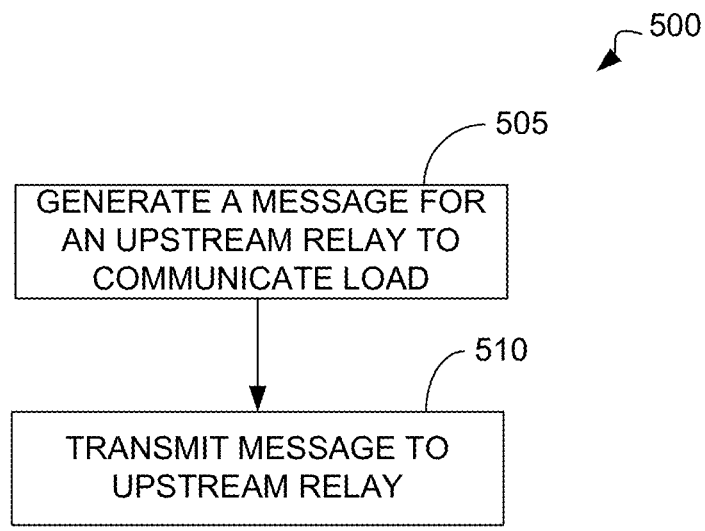
FIG. 5A is a flowchart of a process 500 for performing wireless communication.

FIG. 5A is a flowchart of a process 500 for performing wireless communication. In an embodiment, process 500 may be performed by a relay, such as relay 105*c* in FIG. 2B or FIG. 4B. Process 500 provides an example of a process for communicating a network load associated with the relay to an upstream relay, such as relay 105*b* in FIG. 2B or FIG. 4B. As discussed above, the upstream relay can use the load information to appropriately manage the network association configuration, for example, by refusing an association request from the relay if the upstream relay does not have sufficient available capacity.

As an example, in block 505, relay 105*c*, generates a message for upstream relay 105*b* to communicate the load of the relay 105*c*. In some embodiments, the message indicates a current or potential network load associated with the relay, for example by indicating a number of devices downstream the relay 105*c*. In some embodiments, the message includes a list of IDs for the downstream devices 106. In some embodiments, the relay 105*c* is not associated with the upstream relay 105*b* and the message is included in or with an association request. In some embodiments, the relay 105*c* is already associated with the upstream relay 105*b* and the message is included in or with an action frame. In block 510, the relay 105*b* transmits the message to the upstream relay.

Figure 5B:
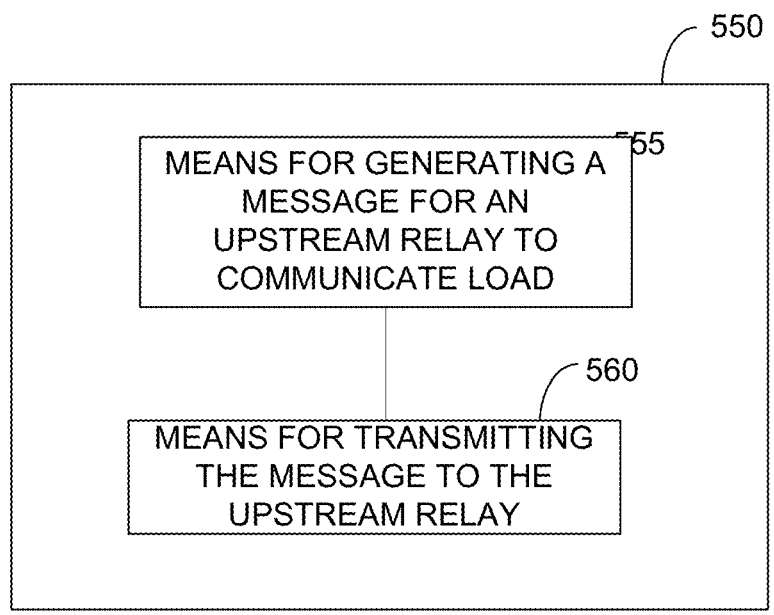
FIG. 5B is a functional block diagram of an exemplary device 550 that may be employed within the wireless communication system 100 or 200.

FIG. 5B is a functional block diagram of an exemplary device 550 that may be employed within the wireless communication system 100 or 200 to, for example, perform the method of FIG. 5A. The device 550 includes means 555 for generating a message for an upstream relay to communicate load. The means 555 may be configured to perform one or more of the functions discussed above with respect to block 505 of FIG. 5A. In an embodiment, the means 555 may be or include a processor, such as processor 304 of FIG. 3. In some embodiments, the means 555 may include one or more of a signal generator, transceiver, decoder, or a combination of hardware and/or software component(s), circuits, and/or module(s).

The device 550 further includes means 560 for transmitting the message to the upstream relay. In an embodiment, means 560 may be configured to perform one or more of the functions discussed above with respect to block 510 of FIG. 5A. The means 560 may include a transmitter, such as transmitter 310 of FIG. 3. Means 560 may also include one or more of a processor, signal generator, transceiver, decoder, or a combination of hardware and/or software component(s), circuits, and/or module(s).

Figure 6A:
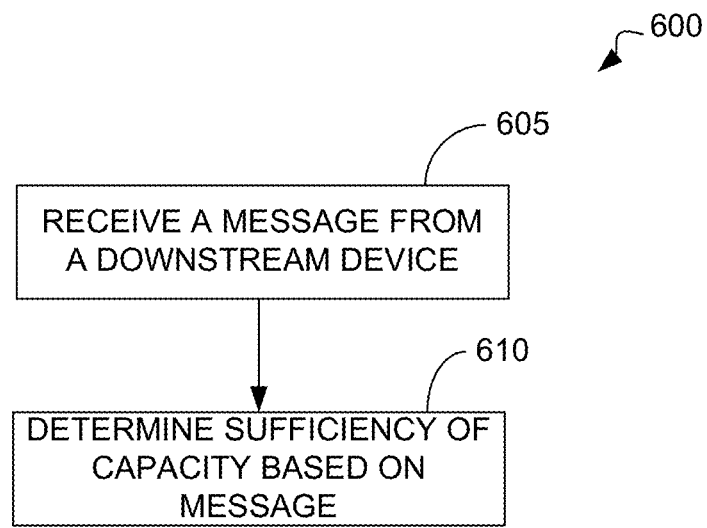
FIG. 6A is a flowchart of a process 600 for performing wireless communication.

FIG. 6A is a flowchart of a process 600 for performing wireless communication. In an embodiment, process 600 may be performed by a relay, such as relay 105*b* in FIG. 2B or FIG. 4B. Process 600 provides an example of a process for determining whether the relay can or will serve a downstream device, such as relay 105*c* in FIG. 2B or FIG. 4B. As discussed above, the relay can determine whether to serve the downstream relay based on its available capacity and the load serving the downstream relay would add.

As an example, in block 605, relay 105*b* receives a message from a downstream device 105*c*. In some embodiments, the message indicates a current or potential network load associated with the downstream device 105*c*, for example by indicating a number of devices downstream the relay 105*c*. In some embodiments, the message includes a list of IDs for the downstream devices. In some embodiments, the downstream device 105*c* is not associated with the relay 105*b* and the message is included in or with an association request. In some embodiments, the downstream device 105*c* is already associated with the relay 105*b* and the message is included in or with an action frame.

In block 610, the relay 105*b* determines whether it has sufficient available capacity to serve the downstream device 105*c*. In some embodiments, to determine the sufficiency of its available capacity, the relay 105*b* compares its current available capacity with the load communicated by the message. In some embodiments, to determine the sufficiency of its available capacity, the relay 105*b* compares an expected available capacity with the load communicated by the message.

If the message is in or included with an association request, the relay 105*b* may generate and send a message to the downstream device 105*c* indicating that the request for association is accepted or denied. In some embodiments, a result of the determination may be communicated to the downstream device.

Figure 6B:
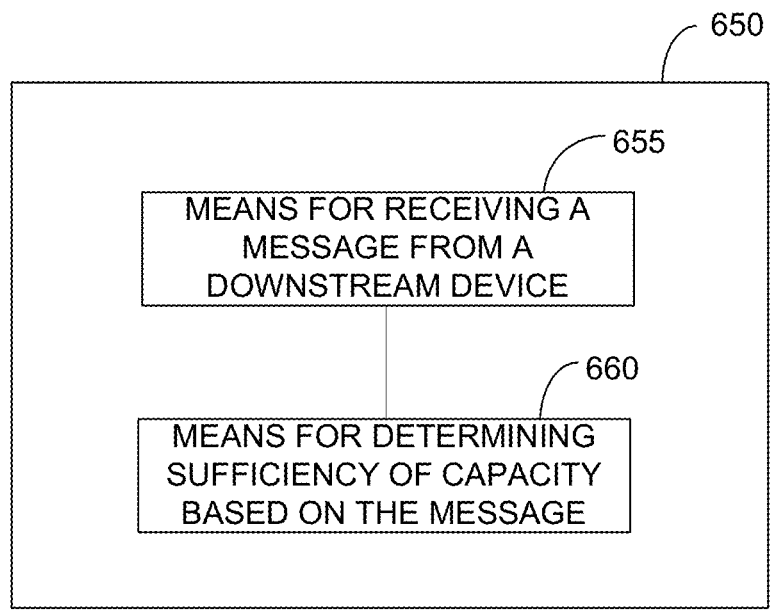
FIG. 6B is a functional block diagram of an exemplary device 650 that may be employed within the wireless communication system 100 or 200.

FIG. 6B is a functional block diagram of an exemplary device 650 that may be employed within the wireless communication system 100 or 200 to, for example, perform the method of FIG. 6A. The device 650 includes means 655 for receiving a message from a downstream device. The means 655 may be configured to perform one or more of the functions discussed above with respect to block 605 of FIG. 6A. In an embodiment, the means 655 may be or include a receiver, such as receiver 312 of FIG. 3. In some embodiments, the means 655 may include one or more of a processor, signal generator, transceiver, decoder, or a combination of hardware and/or software component(s), circuits, and/or module(s).

The device 650 further includes means 660 for determining sufficiency of available capacity based on the message. In an embodiment, means 660 may be configured to perform one or more of the functions discussed above with respect to block 610 of FIG. 6A. The means 660 may include a processor, such as processor 304 of FIG. 3. Means 660 may also include one or more of a signal generator, transceiver, decoder, or a combination of hardware and/or software component(s), circuits, and/or module(s).

In some systems, before sending an association request, a relay may determine which of multiple upstream relays has available capacity to serve the relay and the downstream devices associated therewith. The relay determines whether to send a request by considering a known available capacity of the upstream relays and the additional load the relay would require. The available capacity may be known based on a message received from the upstream relays.

The load available capacity of a relay can be communicated by the relay to downstream relays with a message. For example, within a beacon or a message in or with response to a probe, a parameter representing the available capacity of the relay can be communicated to the downstream relays. For example, a number representing how many new downstream nodes can be serviced may be included in the message, for example, in an information element, which may be called Relay-Available capacity.

A downstream relay receiving the message, may propagate the available capacity to relays which are further downstream. For example, the downstream relay receiving the message may generate a second message to communicate its load available capacity to the relays further downstream. The downstream relay compares its own available capacity with the available capacity reported by the upstream relay, and communicates the lower of the two capacities to the relays further downstream as the available capacity which it may serve. The format of the second message may be similar or identical to the message discussed above which communicates the available capacity of the upstream relay.

Accordingly, each relay may generate messages which communicate its available capacity so that downstream relays may determine from which relays service may be available. In addition, each relay may generate messages for upstream relays which communicate the load an association with the relay would cause. Through such communication between relays, admission control may be used to minimize associations being dropped because of insufficient available capacity.

Figure 7A:
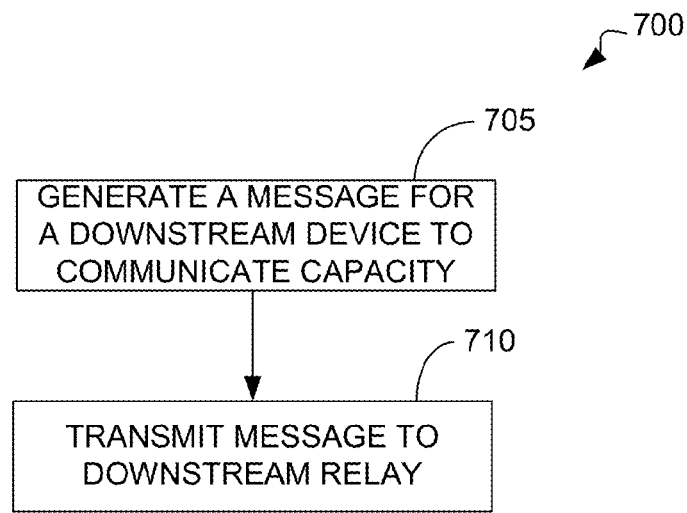
FIG. 7A is a flowchart of a process 700 for performing wireless communication.

FIG. 7A is a flowchart of a process 700 for performing wireless communication. In an embodiment, process 700 may be performed by a relay, such as relay 105*b* in FIG. 2B or FIG. 4B. Process 700 provides an example of a process for communicating a network available capacity associated with the relay to a downstream relay, such as relay 105*c* in FIG. 2B or FIG. 4B. As discussed above, the downstream relay can use the available capacity information to appropriately manage the network association configuration, for example, by not making an association request to the upstream relay if the upstream relay does not have sufficient available capacity.

As an example, in block 705, relay 105*b* generates a message for a downstream device 105*c* to communicate the available capacity of the relay 105*b*. In some embodiments, the message indicates a current or potential available capacity associated with the relay 105*b*, for example by indicating a number of downstream devices the relay 105*b* has available capacity to service. In block 710, the relay 105*b* transmits the message to the downstream relay 105*c*.

Figure 7B:
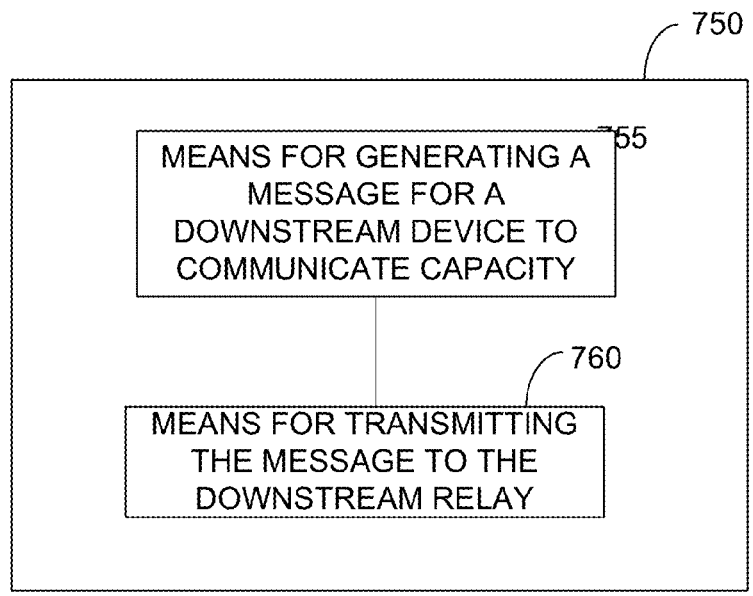
FIG. 7B is a functional block diagram of an exemplary device 750 that may be employed within the wireless communication system 100 or 200.

FIG. 7B is a functional block diagram of an exemplary device 750 that may be employed within the wireless communication system 100 or 200 to, for example, perform the method of FIG. 7A. The device 750 includes means 755 for generating a message for a downstream device to communicate available capacity. The means 755 may be configured to perform one or more of the functions discussed above with respect to block 705 of FIG. 7A. In an embodiment, the means 755 may be or include a processor, such as processor 304 of FIG. 3. In some embodiments, the means 755 may include one or more of a signal generator, transceiver, decoder, or a combination of hardware and/or software component(s), circuits, and/or module(s).

Figure 8A:
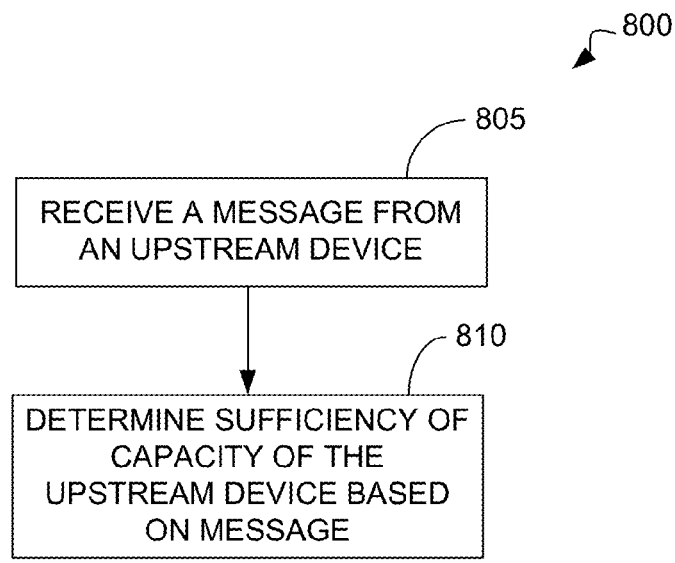
FIG. 8A is a flowchart of a process 800 for performing wireless communication.

FIG. 8A is a flowchart of a process 800 for performing wireless communication. In an embodiment, process 800 may be performed by a relay, such as relay 105*c* in FIG. 2B or FIG. 4B. Process 800 provides an example of a process for determining whether the relay can be served by an upstream device, such as relay 105*b* in FIG. 2B or FIG. 4B. As discussed above, the relay can determine whether to request association with the upstream device based on the upstream devices available capacity and its own load.

As an example, in block 805, relay 105*c* receives a message from upstream device 105*b*. In some embodiments, the message indicates a current or potential network available capacity associated with the upstream device 105*b*, for example by indicating a number of devices the upstream device 105*b* can service.

In block 810, the relay 105*c* determines whether the upstream device 105*b* has sufficient available capacity to serve the relay 105*c*. In some embodiments, to determine the sufficiency of the available capacity, the relay 105*c* compares its own load with the available capacity communicated by the message. In some embodiments, to determine the sufficiency of the available capacity, the relay 105*c* compares an expected load with the available capacity communicated by the message.

Figure 8B:
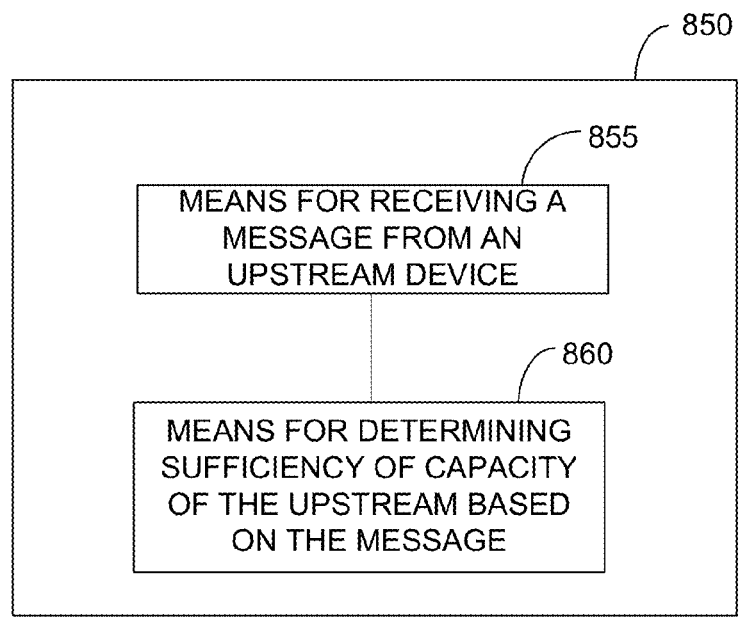
FIG. 8B is a functional block diagram of an exemplary device 850 that may be employed within the wireless communication system 100 or 200.

FIG. 8B is a functional block diagram of an exemplary device 850 that may be employed within the wireless communication system 100 or 200 to, for example, perform the method of FIG. 8A. The device 850 includes means 855 for receiving a message from an upstream device. The means 855 may be configured to perform one or more of the functions discussed above with respect to block 805 of FIG. 8A. In an embodiment, the means 855 may be or include a receiver, such as receiver 312 of FIG. 3. In some embodiments, the means 855 may include one or more of a processor, signal generator, transceiver, decoder, or a combination of hardware and/or software component(s), circuits, and/or module(s).

The device 850 further includes means 860 for determining sufficiency of available capacity of the upstream device based on the message. In an embodiment, means 860 may be configured to perform one or more of the functions discussed above with respect to block 810 of FIG. 8A. The means 860 may include a processor, such as processor 304 of FIG. 3. Means 860 may also include one or more of a signal generator, transceiver, decoder, or a combination of hardware and/or software component(s), circuits, and/or module(s).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of wireless communication, comprising:
at a relay apparatus associated with one or more other devices, receiving a first message from a downstream relay, wherein the first message includes an indication of a number of devices that are associated with the downstream relay;
generating a second message for an upstream relay in response to the first message, wherein the second message is a request for an available capacity of the upstream relay;
transmitting the second message to the upstream relay;
receiving a response message from the upstream relay, the response message indicating the available capacity of the upstream relay; and
determining whether the relay apparatus can serve the downstream relay based on the available capacity of the upstream relay.

2. The method of claim 1, wherein the second message is transmitted with an association request or an action frame.

3. The method of claim 1, wherein the second message includes a list of IDs of devices associated with the relay apparatus.

4. The method of claim 1, wherein the second message includes a quantity of other devices associated with the relay apparatus.

5. A relay apparatus for wireless communications, the relay apparatus being associated with one or more other devices, the relay apparatus comprising:
a processor configured to:
 receive a first message from a downstream relay, wherein the first message includes an indication of a number of devices that are associated with the downstream relay; and
 generate a second message for an upstream relay in response to the first message, wherein the second message is a request for an available capacity of the upstream relay;
a transmitter configured to transmit the second message to the upstream relay; and
a receiver configured to receive a response message from the upstream relay, the response message indicating the available capacity of the upstream relay, wherein the processor is further configured to determine whether the relay apparatus can serve the downstream relay based on the available capacity of the upstream relay.

6. The relay apparatus of claim 5, wherein the second message is transmitted with an association request or an action frame.

7. The relay apparatus of claim 5, wherein the second message includes a list of IDs of devices associated with the relay apparatus.

8. The relay apparatus of claim 5, wherein the second message includes a quantity of other devices associated with the relay apparatus.

9. A relay apparatus for wireless communications, the relay apparatus being associated with one or more other devices, the relay apparatus comprising:
means for receiving a first message from a downstream relay, wherein the first message includes an indication of a number of devices that are associated with the downstream relay;
means for generating a second message for an upstream relay in response to the first message, wherein the second message is a request for an available capacity of the upstream relay;
means for transmitting the second message to the upstream relay;
means for receiving a response message from the upstream relay, wherein the response message indicates the available capacity of the upstream relay; and
means for determining whether the relay apparatus can serve the downstream relay based on the available capacity of the upstream relay.

10. The relay apparatus of claim 9, wherein the second message is transmitted with an association request or an action frame.

11. The relay apparatus of claim 9, wherein the second message includes a list of IDs of devices associated with the relay apparatus.

12. The relay apparatus of claim 9, wherein the second message includes a quantity of other devices associated with the relay apparatus.

13. A method of wireless communication, comprising:
at a relay apparatus associated with one or more other devices, receiving a first message from an upstream relay, wherein the first message includes an indication of a number of devices that the upstream relay has available capacity to serve;
comparing the number of devices that the upstream relay has available capacity to serve with a number of devices that the relay apparatus has available capacity to serve;
generating a second message for the one or more other devices, wherein the second message includes an indication of a lower of the number of devices that the upstream relay has available capacity to serve and the number of devices the relay apparatus has available capacity to serve;
transmitting the second message to at least one of the one or more other devices; and
receiving an association request from at least one of the one or more other devices.

14. The method of claim 13, wherein the second message is transmitted with a beacon.

15. The method of claim 13, wherein the second message is transmitted with a probe response.

16. The method of claim 13, wherein the second message includes a number representing how many additional nodes can be serviced by the relay apparatus.

17. A relay apparatus for wireless communications, comprising:
a processor configured to:
 receive a first message from an upstream relay, wherein the first message includes an indication of a number of devices that the upstream relay has available capacity to serve;
 compare the number of devices that the upstream relay has available capacity to serve with a number of devices that the relay apparatus has available capacity to serve;
 generate a second message for one or more devices, wherein the second message includes an indication of a lower of the number of devices that the upstream relay has available capacity to serve and the number of devices the relay apparatus has available capacity to serve;
a transmitter configured to transmit the second message to the one or more devices; and a receiver configured to receive an association request from at least one of the one or more devices.

18. The relay apparatus of claim 17, wherein the second message is transmitted with a beacon.

19. The relay apparatus of claim 17, wherein the second message is transmitted with a probe response.

20. The relay apparatus of claim 17, wherein the second message includes a number representing how many additional nodes can be serviced by the relay apparatus.

21. A relay apparatus for wireless communications, comprising:
means for receiving a first message from an upstream relay, wherein the first message includes an indication of a number of devices that the upstream relay has available capacity to serve;
means for comparing the number of devices that the upstream relay has available capacity to serve with a number of devices that the relay apparatus has available capacity to serve
means for generating a second message for one or more other devices, wherein the second message includes an indication of a lower of the number of devices that the upstream relay has available capacity to serve and the number of other devices the relay apparatus has available capacity to serve;
means for transmitting the message to at least one of the one or more other devices; and
means for receiving an association request from at least one of the one or more other devices.

22. The relay apparatus of claim 21, wherein the second message is transmitted with a beacon.

23. The relay apparatus of claim 21, wherein the second message is transmitted with a probe response.

24. The relay apparatus of claim 21, wherein the second message includes a number representing how many additional nodes can be serviced by the relay apparatus.

25. A method of wireless communication, comprising:
at a relay apparatus, wherein one or more other devices are associated with the relay apparatus, and wherein the relay apparatus is in communication with a relay device, receiving a message from the relay device, wherein the message includes an indication of a number of other devices the relay device has available capacity to serve;
determining whether the relay device has available capacity to serve the relay apparatus and the one or more other devices associated with the relay apparatus; and
sending an association request to the relay device if the relay device has the available capacity to serve the relay apparatus, wherein the receiving further comprises receiving another message from another relay device, wherein the other message includes an indication of a number of additional devices the other relay device has available capacity to serve, wherein the determining further comprises determining which of the relay device and the other relay device has the available capacity to serve the relay apparatus, and wherein the sending further comprises sending the association request to the determined relay device.

26. The method of claim 25, further comprising generating a second message, wherein the second message includes an indication of a number of additional devices the relay apparatus has available capacity to serve.

27. The method of claim 26, wherein the number of additional devices the relay apparatus has available capacity to serve is the lesser of the relay apparatus' own available capacity and the available capacity of the relay device.

28. A relay apparatus for wireless communications, wherein one or more other devices are associated with the relay apparatus, and wherein the relay apparatus is in communication with a relay device, the relay apparatus comprising:
a receiver configured to receive a message from the relay device, wherein the message includes an indication of a number of other devices the relay device has available capacity to serve;
a processor configured to determine whether the relay device has available capacity to serve the relay apparatus and the one or more other devices associated with the relay apparatus; and
a transmitter configured to send an association request to the relay device if the relay device has the available capacity to serve the relay apparatus, wherein the receiver is further configured to receive another message from another relay device, wherein the other message includes an indication of a number of additional devices the other relay device has available capacity to serve, wherein the processor is further configured to determine which of the relay device and the other relay device has the available capacity to serve the relay apparatus, and wherein the transmitter is further configured to transmit the association request to the determined relay device.

29. The relay apparatus of claim 28, further comprising generating a second message, wherein the second message includes an indication of a number of additional devices the relay apparatus has available capacity to serve.

30. The relay apparatus of claim 29, wherein the number of additional devices the relay apparatus has the available capacity to serve is the lesser of the relay apparatus' own available capacity and the available capacity of the relay device.

31. A relay apparatus for wireless communications, wherein one or more other devices are associated with the relay apparatus, and wherein the relay apparatus is in communication with a relay device, the relay apparatus comprising:
means for receiving a message from the relay device, wherein the message includes an indication of a number of other devices the relay device has available capacity to serve;
means for determining whether the relay device has available capacity to serve the relay apparatus and the one or more other devices associated with the relay apparatus; and
means for sending an association request to the relay device if the relay device has the available capacity to serve the relay apparatus, wherein the means for receiving further comprises means for receiving another message from another relay device, wherein the other message includes an indication of a number of additional devices the other relay device has available capacity to serve, wherein the means for determining further comprises means for determining which of the relay device and the other relay device has the available capacity to serve the relay apparatus, and wherein the means for sending the association request further comprises means for transmitting the association request to the determined relay device.

32. The relay apparatus of claim 31, further comprising generating a second message, wherein the second message includes an indication of a number of additional devices the relay apparatus has available capacity to serve.

33. The relay apparatus of claim 32, wherein the number of additional devices the relay apparatus has the available capacity to serve is the lesser of the relay apparatus' own available capacity and the available capacity of the relay device.

\* \* \* \* \*